United States Patent [19]
Powell

[11] Patent Number: 5,904,361
[45] Date of Patent: May 18, 1999

[54] REMOVABLE MUDGUARD FOR A BICYCLE

[76] Inventor: Eugene I. Powell, 273 Christopher Ave., Campbell, Calif. 95008

[21] Appl. No.: 08/774,381

[22] Filed: Dec. 30, 1996

[51] Int. Cl.[6] .................................................. B62D 25/18
[52] U.S. Cl. .................................... 280/152.1; 280/160.1; 293/105
[58] Field of Search .......................... 280/152.1, 152.2, 280/152.3, 847, 848, 154, 851, 852, 158.1, 160.1; 293/105

[56] References Cited

U.S. PATENT DOCUMENTS

| | | | |
|---|---|---|---|
| 4,422,659 | 12/1983 | Nebu | 280/152.1 |
| 5,120,073 | 6/1992 | Sealy | 280/152.1 |
| 5,322,311 | 6/1994 | Dunn | 280/152.1 |

*Primary Examiner*—Peter M. Poon
*Assistant Examiner*—Pamela J. Lipka
*Attorney, Agent, or Firm*—Robert Samuel Smith

[57] ABSTRACT

A removable mudguard system for a bicycle including one shield for the rear wheel and one shield for the front wheel. The rear wheel shield is formed into an arcuate shape that conforms to the outside surface of a top section of the rear wheel. Support rods having ends integrally formed with edges of the shield extend toward the rear fork legs of the bicycle frame and have clips or resilient hooks on the other ends of the rods which are attachable to the legs. The clips are conveniently disengaged from the legs when it is desired to remove the mudguard such as during dry weather.

6 Claims, 2 Drawing Sheets

REMOVABLE MUDGUARD FOR A BICYCLE

FIELD OF THE INVENTION

This invention relates to mudguards for bicycles and particularly to mudguards that are removable.

PRIOR ART AND INFORMATION STATEMENT

The two wheel bicycle has enjoyed great popularity ever since its appearance in the market a century ago. In the present market, there are numerous variations of the bicycle corresponding to the variety of purposes for which a cyclist uses his/her bicycle. These variations show up in the weight and design of the frame, the wheels and the handlebars and correspond to whether the cyclist is going to use his bicycle for i-acing on a speedway, touring country highways, delivering mail or newspapers, rough mountain biking or general transportation around town or campus.

The typical bicycle has a pair of fenders, one fender for the front wheel, one fender for the rear wheel, that prevent mud from being thrown against the rider. According to present state of the art, bicycle fenders are metal or composite sheets that are contoured around the top surface of the wheel with supporting rods having one end secured to the hub and the other end extending radially outwards for attachment to the edge of the sheet.

Without such fenders, during wet weather, water and mud from each wheel, thrown against the legs, body and face of the rider render bicycle riding unpleasant at best, impossible at worst depending on the weather conditions. During fair weather, in dry conditions, the fenders are simply added weight that is unnecessary for their intended purpose.

Fenders are a source of air resistance. Unnecessary weight and added air resistance is a matter of major concern to many cyclists—especially to the rabid racing enthusiast or the long distance tour enthusiast who will pay a lot for a feature that shaves a few ounces of weight or resistance from his/her bicycle.

Another problem with bicycle fenders is that fenders and wheels are frequently damaged so that either or both fenders and wheels must be repaired or replaced.

Yet another problem with the present design of fenders is associated with the practice of removing the wheels of the bicycle when the bicycle is being stored. With the wheels removed, the fenders add substantial length to the bicycle which makes storage of the bicycle less convenient.

A number of bicycle mudguards (fenders) have been disclosed in the patent literature.

U.S. Pat. No. 4,422,659 to Nebu discloses a fender body fixedly attached to a motorcycle frame and a fender member removably attached to the fender body to provide easy access for removal of the rear wheel.

U.S. Pat. No. 5,120,073 to Sealy discloses three separate fender elements including two elements attachable to the rear wheel axle and a third element attachable to the seat.

U.S. Pat. No. 5,322,311 discloses a bicycle mud guard attachable to the seat post of the bicycle which is cantileveredly rearwardly over the rear wheel.

None of these references disclose a mudguard system that is as convenient to mount and dismount, nor as economical to construct as characterizes the present invention.

SUMMARY OF THE INVENTION

In view of the problems associated with fenders and outlined above, it is an object of this invention to provide a mudguard for a bicycle that can be conveniently removed for use of the bicycle during fair weather under dry conditions or when the bicycle is stored and mounted on the bicycle when weather conditions require protection against flying mud and water. It is a further object that the mudguard be removable and installable without the use of tools such as wrenches so that removal and installation can be accomplished on the road. The complete mudguard has two parts.

One part is a contoured sheet which fits over the top of the rear wheel such as to shield the cyclist from mud and water flying off the rear wheel. Rod supports extend from the sheet have opposite ends which snap onto the bicycle frame member extending upward from the rear axle to support the seat.

The second part snaps onto the front frame member extending obliquely upward and forward from the pedal axle to the handle bar. The second part protects the cyclist from mud and water flying of the front wheel.

According to this arrangement, either or both parts can be quickly "unsnapped" from their position on the bicycle and removed for temporarily storage.

Figure 1:
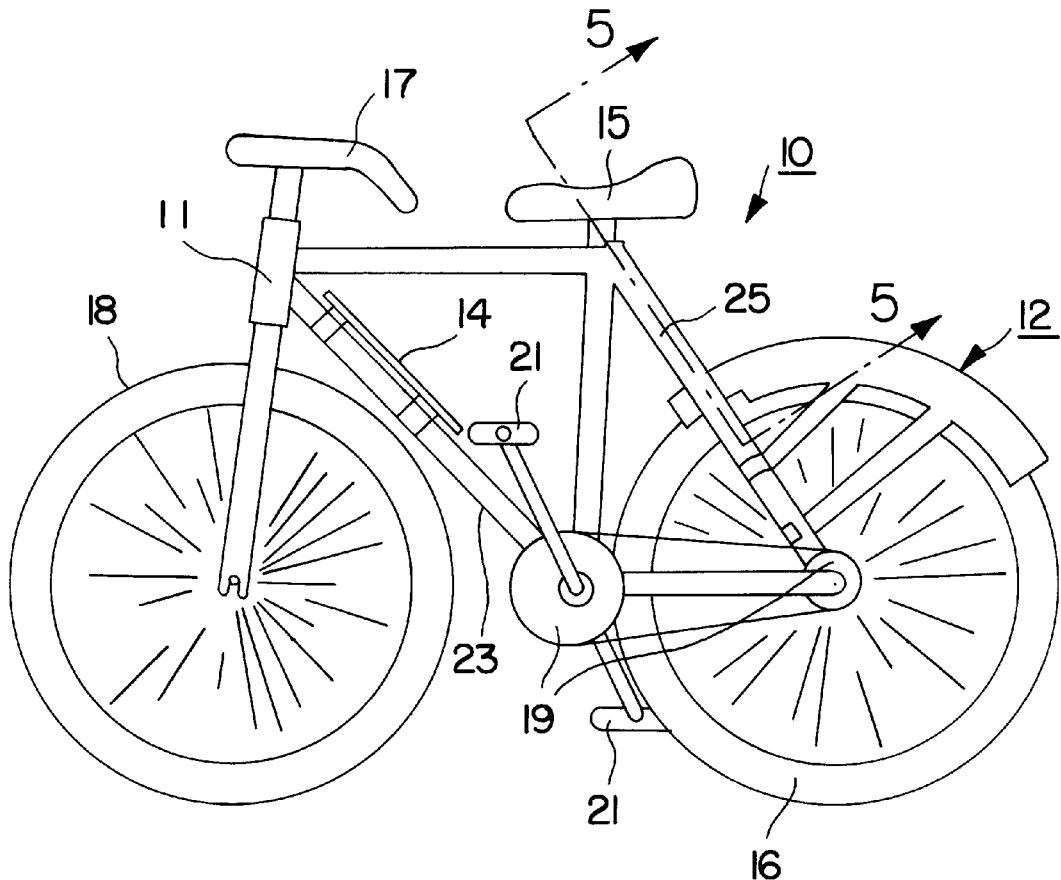
FIG. 1 shows a bicycle with the mudguard of this invention.

DESCRIPTION OF THE PREFERRED MODE:

Turning now to a discussion of the drawings, FIG. 1 shows a side view of the typical bicycle 10 without state of the art fenders but including front wheel 18, rear wheel 16, seat 15, handlebar 17 and a drive system including sprockets 19 with pedals 21. The bicycle frame includes an oblique forward bar 23 extending between handlebar support 11 and sprocket assembly 19. The bicycle also has a rearward oblique fork 25. Only one member of fork 25 is shown in FIG. 1 but it will be understood that the rear fork straddles the rear wheel 16 with one leg on one side and the other leg on the opposite side of the real wheel.

A first mudguard 12 of this invention is positioned over the rear wheel 16 and a second mudguard 14 of this invention is positioned to shield against mud slung from the front wheel 18.

Figure 2:
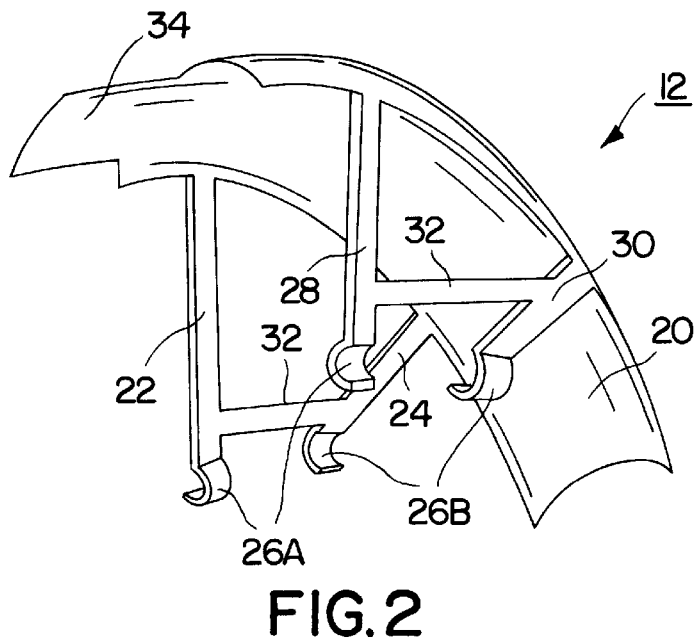
FIG. 2 is perspective view of the removable mud guard for the rear wheel shown in FIG. 1.

FIG. 2 shows details of the first mudguard including a shield 20 contoured for positioning over the rear wheel 16. The shield is substantially an arcuate shape being a section of a toroid dimensioned to conform to but out of contact with the outer surface of the wheel tire. Two support rods, 22 and 24, extend from one edge of the shield 20 and two support rods, 28 and 30, extend from an opposite edge of the shield 20. Braces 32 connect rear support rods 22 to 24 and rods 28 to 30. Each support rod is provided with a resilient clip 26 on its extended end.

Figure 3:
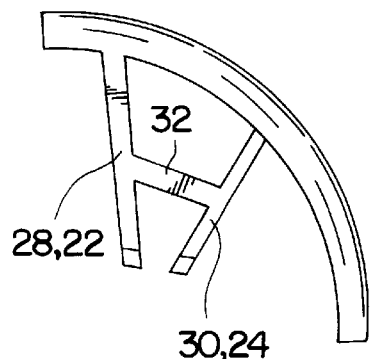
FIG. 3 shows a right elevational view of the mudguard of FIG. 2.

FIG. 3 is a side view of the first mudguard showing alignment of the resilient clips 26 A and 26B.

Figure 4:
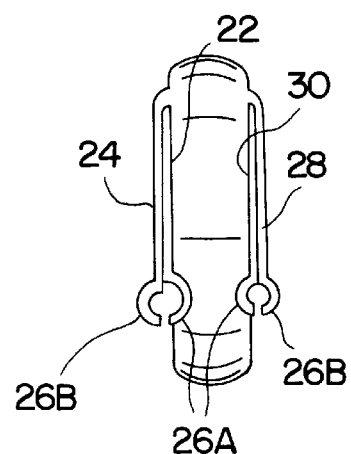
FIG. 4 shows a front elevational view of the mudguard of FIG. 2.

FIG. 4 is an end view of the first mudguard showing that clips 26A are concave toward one another while hooks 26B are convex toward one another. FIG. 4 also shows that clips 26A and 26B are aligned so that, as shown in FIG. 1, the clips snappingly engage the respective fork branch with one of rear fork legs 25 extending through one pair of clips 26 A and B on one side of the wheel 16 and the other leg of rear fork 25 can extend through the other leg of rear fork 25 on the other side of the wheel 16.

Figure 7:
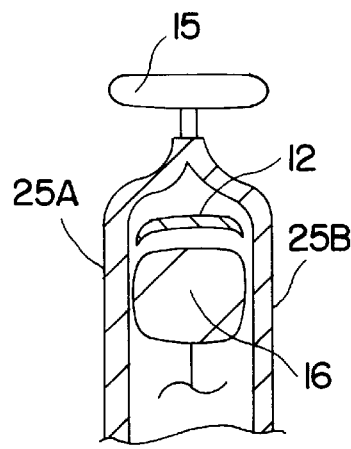
FIG. 7 is a sectional view of the rear fork and mudguard.

FIG. 2 shows the end of shield 20 having a narrow section 34 which, as shown in the cutaway sectional view of FIG. 7, fits between the legs 25A and 25 B under the seat 15 so that the mudguard is further supported in its alignment with the rear wheel.

Figure 5:
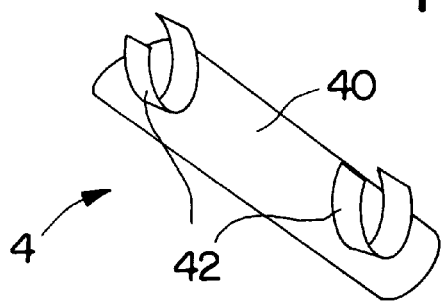
FIG. 5 shows a mudguard of this invention attachable to the bicycle frame shown in FIG. 1.

FIG. 5 shows details of the second mudguard of this invention which is shown in FIG. 1 to be clipped onto oblique forward bar 23. The second mudguard 14 is a substantially flat sheet 40 with two resilient catches 42 mounted on one side of sheet 40. As shown in FIG. 1, the second mudguard 14 snaps onto the obliquely forward frame bar 23.

Mudguards for the front and rear wheels of a bicycle have been described which offer greatly valued advantages over mudguards of the present state of the art. A major feature is that the mudguards can be quickly and conveniently installed "on the road" without the use of tools. The mud guards of this invention are also less costly than mudguards of the present state of the art.

Another convenience offered by the mudguards of the invention is that when state of the art mudguards become damaged, they may be replaced by the mudguards of this invention.

Variations and modifications of the invention may occur to the reader after reading the specification and studying the drawings which are within the scope of the invention.

For example, the mudguards may be metal or plastic.

Figure 6:
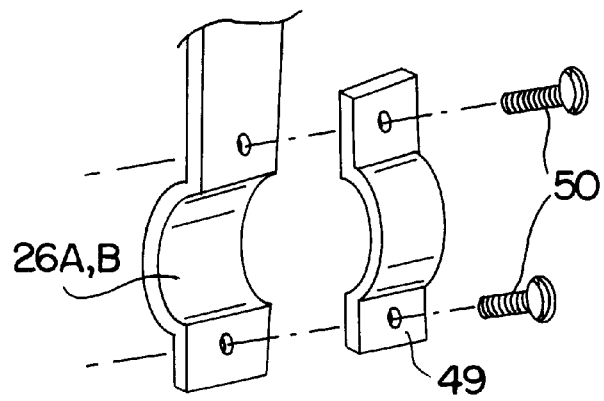
FIG. 6 shows details of the clips to the legs of the frames.

As shown in FIG. 6, a keeper 49 may be bolted with bolts 50 to each clip 26 A, B for a more permanent attachment.

I therefore wish to define the scope of my invention by the appended claims.

What is claimed is:

1. A mudguard means for a bicycle having a frame, wherein said frame has a rear fork (25), said rear fork having a first leg and a second leg, wherein a first end of said first leg is joined to a first end of said second leg under a seat (15) of said bicycle, wherein a second end of said first leg is joined to a first end of a rear axle of said bicycle on one side of a rear wheel (16), and wherein a second end of said second leg is joined to a second end of the rear axle of said bicycle on another side of said rear wheel, said bicycle having a support bar (23) extending from a handlebar support (11) to a sprocket assembly (19), said mudguard means comprising:

a flat sheet;

a plurality of clip means for detachably engaging said flat sheet and the support bar;

said flat sheet having a shape selected to shield a cyclist on said seat from water thrown by a front wheel of said bicycle when said flat sheet is attachably engaged with said support bar;

a shield (20) being a sheet having substantially an arcuate shape of a sector of an outer surface of said wheel;

a plurality of support rods (22, 24, 28, 30) each support rod having one end joined to an edge of said sheet and another end having means (26A,B) for detachably engaging one of said legs of said rear fork such that said shield is supported concentric with and out of contact with said rear wheel between a cyclist on said seat and said rear wheel.

2. The mudguard means of claim 1 wherein said means for detachably engaging one of said legs of said rear fork comprises a pair of resilient clips (26A,B) whereby a cyclist is enabled to engage said resilient clips with one of said legs to install said mudguard means and disengage said resilient clips from one of said legs to remove said mudguard means without using a tool.

3. The mudguard means of claim 2 wherein each resilient clip (26A, B) has a keeper 49 adapted for securing said clip on a respective leg (25).

4. The mudguard of claim 1 wherein said sheet has a section (34) selected to fit snugly between said legs of said rear fork proximal to said seat providing additional support of said shield in alignment with said rear wheel.

5. The mudguard means of claim 1 wherein said flat sheet and said shield are made of metal.

6. The mudguard means of claim 1 wherein said flat sheet and said shield are made of plastic.

* * * * *